Oct. 23, 1951 — E. A. MITCHELL — 2,572,369
TIRE GAUGE INSTALLATION
Filed Aug. 4, 1947
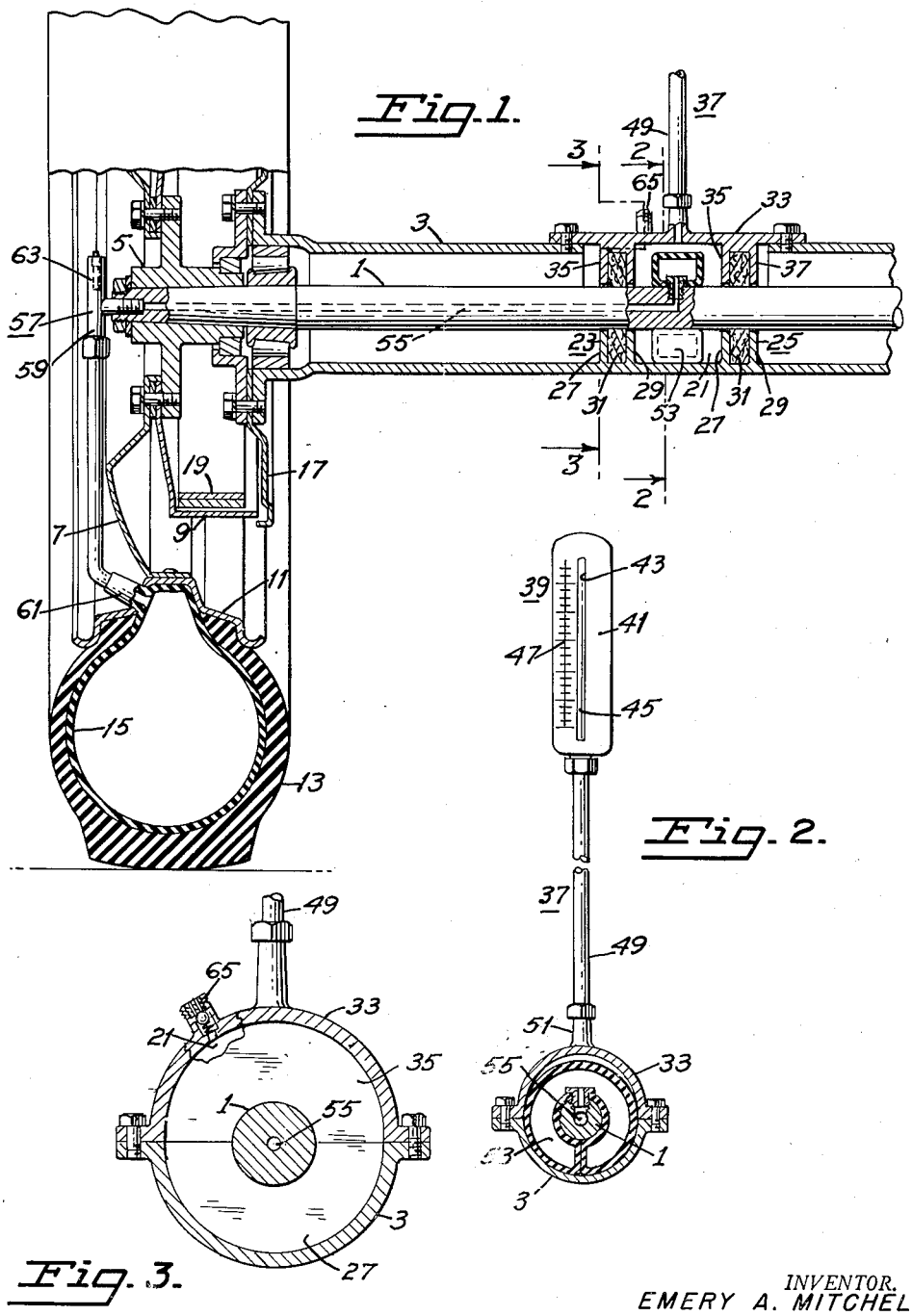
INVENTOR.
EMERY A. MITCHELL
BY Bruce + Brosler
HIS ATTORNEYS

UNITED STATES PATENT OFFICE 2,572,369

TIRE GAUGE INSTALLATION

Emery A. Mitchell, Richmond, Calif., assignor of one-fourth to Edward G. Bellamy and one-fourth to John W. Harris, both of Richmond, Calif.

Application August 4, 1947, Serial No. 765,842

3 Claims. (Cl. 73—390)

My invention relates to tire gauges, and more particularly to permanent tire gauge installations on automotive vehicles.

Among the objects of my invention are:

(1) To provide a novel and improved tire gauge installation for automotive vehicles;

(2) To provide a novel and improved tire gauge installation for automotive vehicles, which shall be simple in design and installation;

(3) To provide a novel and improved tire gauge installation for automotive vehicles, which is capable of accurate adjustment;

(4) To provide a novel and improved tire gauge installation for automotive vehicles, which will respond quickly to changes in air pressure of tires on such vehicle.

Additional objects of my invention will be brought out in the following description of a preferred embodiment of the same, taken in conjunction with the accompanying drawings wherein—

Figure 1 is a fragmentary view in section through the pertinent portion of a rear axle and wheel assembly of an automotive vehicle, illustrating an installation of my invention in its preferred form;

Figure 2 is a view in section through the axle and wheel assembly of Figure 1 taken in the plane 2—2, and including a gauge adapted for mounting on the dashboard of a vehicle;

Figure 3 is a view in section taken in the plane 3—3 of Figure 1.

For details of my invention in its preferred form, reference will be had to the accompanying drawings wherein I have illustrated the invention as embodied in a rear axle and wheel assembly of conventional design.

Such assembly includes an axle 1 within an axle housing 3, the axle carrying at its extremity, a wheel which includes a hub 5 on which is mounted a wheel disk 7 and a brake drum 9. The wheel disk carries a rim 11 for receiving the tire 13 of the pneumatic type which includes an inner tube 15, while the brake drum is closed by a cap 17 carried by the axle housing and forming an enclosure for the brake bands 19.

In applying the invention to the above type of construction, an axle housing chamber 21 is created by a pair of partitions 23 and 25 encircling the axle within the housing in spaced relationship to each other. This may be accomplished by removing a section of the axle housing, forming each partition by a pair of spaced supporting walls 27 and 29 encircling the lower portion of the axle and affixed to the axle housing as by welding at spaced points. Between these supporting walls, there is inserted a ring-shaped seal 31 of any suitable sealing compound or material. The partitions are then completed by a cap 33 closing the opening in the axle housing and having depending seal-supporting walls 35 forming a complementary fit with the corresponding supporting walls in the lower portion of the axle housing. The chamber thus created is adapted to hold liquid.

A liquid communication connection 37 is provided between this chamber and a pressure indicator 39 adapted for mounting on the dashboard of the vehicle. Such indicator may be of simple construction involving a panel board 41 provided with a longitudinal slot 43 therethrough and having a liquid column tube 45 mounted behind the panel board in line with the slot. The liquid column tube may be graduated in terms of tire pressure by suitable markings 47 on the panel board alongside the slot.

The liquid communication connection between the chamber and the indicator is provided by a flexible tube 49 coupled at one end to a fitting 51 on the chamber cap and at its other end, to the indicator.

By altering the effective volume of the chamber in response to changes in air pressure in the tire tube, the indicator on the dashboard may be made to indicate such changes promptly and accurately. Such changes in the effective volume of the chamber may be realized by placing therein an inflatable sack 53 and connecting the same to the inner tube of the tire in such a manner as not to interfere with rotational movement of the wheel.

The inflatable sack may take the form of a doughnut-shaped tube adapted to be sprung around the axle. In effecting its connection to the tire tube, I provide an axial passage 55 through the axle from the wheel-supporting end to the point at which the doughnut-shaped tube is positioned, and the inflatable tube is connected to such passage by a suitable fitting.

At the wheel-mounting end of the axle, I provide a T-fitting 57, one arm 59 of which is connected to the valve stem 61 of the inner tube, while the other arm 63 of the T connection houses the conventional type Shrader valve. This arrangement leaves the inner tube of the tire in continuous unobstructed connection to the inflatable doughnut-shaped tube in the axle housing chamber, while at the same time permitting air to be pumped into the inner tube as and when necessary without disturbing the rest of the set-up.

Whatever liquid is employed in the chamber to the indicator, the same may be introduced into the chamber through a fitting 65 in the chamber cover. Through this means, the reading level of the liquid in the indicator may be determined for accurate readings.

It will be apparent from the above description of my invention in its preferred form, that the same fulfills all the objects previously recited therefor, and while I have disclosed such preferred embodiment in considerable detail, I do not desire to be limited in my protection to such details, except as may be necessitated by the appended claims.

I claim:

1. In a vehicle having an axle, an axle housing enclosing said axle, a wheel on said axle and including a pneumatic tire; the combination of means defining a chamber within said axle housing for holding liquid, said means including a pair of partitions encircling said axle within said housing in spaced relationship to each other; a pressure indicator adaptable for mounting on the dashboard of such vehicle; means providing a liquid communication connection between said pressure indicator and said axle housing chamber, said means including a flexible tube coupled at one end to said pressure indicator and at its other end to the axle housing at a point between the positions of said spaced partitions; and means responsive to changes in air pressure in said pneumatic tire for altering the effective volume of said axle housing chamber to correspondingly indicate on said indicator, changes in pressure occurring in said tire; said air pressure change responsive means including an inflatable tube encircling said axle within said chamber and a connection between the valve stem of said tire and said inflatable tube.

2. In a vehicle having an axle, an axle housing enclosing said axle, a wheel on said axle and including a pneumatic tire; the combination of means defining a chamber within said axle housing for holding liquid, said means including a pair of partitions encircling said axle within said housing in spaced relationship to each other; a pressure indicator adaptable for mounting on the dashboard of such vehicle; means providing a liquid communication connection between said pressure indicator and said axle housing chamber, said means including a flexible tube coupled at one end to said pressure indicator and at its other end to the axle housing at a point between the positions of said spaced partitions; and means responsive to changes in air pressure in said pneumatic tire for altering the effective volume of said axle housing chamber to correspondingly indicate on said indicator, changes in pressure occurring in said tire, said air pressure change responsive means including a passage through the wheel mounting end of said axle and terminating at a point in said axle between said partitions; an inflatable tube encircling said axle within said chamber and coupled to said axle passage, and a connection between the inner tube of said tire and the wheel mounting end of said axle passage.

3. In a vehicle having an axle, an axle housing enclosing said axle, a wheel on said axle and including a pneumatic tire; the combination of means defining a chamber within said axle housing for holding liquid, said means including a pair of partitions encircling said axle within said housing in spaced relationship to each other; a pressure indicator adaptable for mounting on the dashboard of such vehicle, said pressure indicator including a liquid column tube calibrated in terms of tire pressures; means providing a liquid communication connection between said liquid column tube and said axle housing chamber, said means including a flexible tube coupled at one end to said pressure indicator and at its other end to the axle housing at a point between the positions of said spaced partitions; and means responsive to changes in air pressure in said pneumatic tire for altering the effective volume of said axle housing chamber to correspondingly vary the height of liquid in said liquid column tube whereby to indicate changes in pressure occurring in said tire, said air pressure change responsive means including a passage through the wheel mounting end of said axle and terminating at a point in said axle between said partitions, an inflatable tube encircling said axle within said chamber and coupled to said axle passage, and a connection between the valve stem of said tire and the wheel mounting end of said axle passage.

EMERY A. MITCHELL.

REFERENCES CITED

The following references are of record in the file of this patent:

UNITED STATES PATENTS

| Number | Name | Date |
|--------|------|------|
| 327,403 | McDonnell | Sept. 29, 1885 |
| 1,849,139 | Denmire | Mar. 15, 1932 |
| 2,071,191 | Wotring | Feb. 16, 1937 |
| 2,152,159 | Smith et al. | Mar. 28, 1939 |